United States Patent
Kaneko (10) Patent No.: US 7,439,953 B2
(45) Date of Patent: Oct. 21, 2008

(54) INFORMATION APPARATUS AND METHOD OF SELECTING OPERATION SELECTING ELEMENT

(75) Inventor: Susumu Kaneko, Tokyo (JP)

(73) Assignee: NEC Corporation, Tokyo (JP)

( * ) Notice: Subject to any disclaimer, the term of this patent is extended or adjusted under 35 U.S.C. 154(b) by 612 days.

(21) Appl. No.: 11/038,055

(22) Filed: Jan. 21, 2005

(65) Prior Publication Data

US 2005/0166162 A1 Jul. 28, 2005

(30) Foreign Application Priority Data

Jan. 27, 2004 (JP) ............................. 2004-018242

(51) Int. Cl.
G06F 3/033 (2006.01)
G09G 5/00 (2006.01)
G06F 3/048 (2006.01)

(52) U.S. Cl. ........................ 345/157; 345/156; 345/162; 715/856

(58) Field of Classification Search ................. 345/156, 345/157, 162; 715/856, 858, 860, 864
See application file for complete search history.

(56) References Cited

U.S. PATENT DOCUMENTS

| | | | | |
|---|---|---|---|---|
| 5,298,890 A | * | 3/1994 | Kanamaru et al. | 345/157 |
| 5,990,893 A | * | 11/1999 | Numazaki | 715/863 |
| 6,580,416 B1 | * | 6/2003 | Gardner | 345/157 |
| 6,861,946 B2 | * | 3/2005 | Verplaetse et al. | 340/407.2 |
| 2002/0178007 A1 | * | 11/2002 | Slotznick et al. | 704/270.1 |
| 2004/0021696 A1 | * | 2/2004 | Molgaard | 345/810 |
| 2005/0041014 A1 | * | 2/2005 | Slotznick | 345/156 |
| 2006/0064649 A1 | * | 3/2006 | Weber et al. | 715/811 |
| 2007/0106939 A1 | * | 5/2007 | Qassoudi | 715/704 |

FOREIGN PATENT DOCUMENTS

JP 3-135617 6/1991

* cited by examiner

Primary Examiner—Amare Mengistu
Assistant Examiner—Elijah M Sheets
(74) Attorney, Agent, or Firm—Foley & Lardner LLP (57) ABSTRACT

An information apparatus includes a display unit which displays an icon, a pointer, and the like, and a pointing device. When the pointer executes predetermined movement and stop in an icon-selection effective region formed in a periphery of the icon, the information apparatus determines that the pointer has selected the above-described icon. It is possible to apply a menu item in place of the icon. It is possible to set plural conditions for determining that the icon has been selected. It is possible for an operator to easily select the icon and the like on a small display unit by using the pointing device.

15 Claims, 7 Drawing Sheets

INFORMATION APPARATUS AND METHOD OF SELECTING OPERATION SELECTING ELEMENT

BACKGROUND OF THE INVENTION

1. Field of the Invention

The present invention relates to an information apparatus having a pointing device. Moreover, the present invention relates to a method of selecting a desired operation selecting element by means of the pointing device. In particular, the present invention relates to a technology which makes it possible to easily and rapidly select, by means of a pointer, a small icon and the like which are displayed on a small display unit of the information apparatus.

2. Description of the Related Art

In recent years, graphical user interfaces (GUI) similar to those of home computers have been required for information apparatuses such as a cellular phone and a personal digital assistant (PDA). Accordingly, various pointing devices for use in home computers have been applied to the information apparatuses. An operator selects an icon or a menu item on a display unit by using a pointing device. In order to apply the pointing device to a small information apparatus, it is necessary to reduce the size of the pointing device. However, it is hard to operate a small pointing device, and accordingly, it is difficult to accurately and rapidly move the pointer to a target position.

JP 03-135617 A discloses a technology which simplifies a cursor operation to facilitate an operation of selecting an item. In some cases, plural icon selections are required in order to execute a desired operation. In such cases, when the icon is selected for the second time, the pointer is placed in advance on an icon with the highest selection frequency. Accordingly, an operation of selecting the icon becomes somewhat facilitated. However, the method described above does not reduce difficulty when the icon is selected for the first time.

SUMMARY OF THE INVENTION

An information apparatus of the present invention includes a display unit and a pointing device. The pointing device controls a pointer to select an operation selecting element on the display unit. The information apparatus further includes a pointer information storage unit, an operation selecting element storage unit, and a determination condition storage unit. The pointer information storage unit stores the movement and stop of the pointer. The operation selecting element storage unit stores data on a predetermined peripheral region of the operation selecting element. The determination condition storage unit stores a condition for determining that the pointer has selected the operation selecting element. The information apparatus further includes a determination unit which determines that the operation selecting element has been selected.

A method of selecting an operation selecting element of the present invention includes the following steps. That is, the steps include: detecting the movement and stop of a pointer in a peripheral region of the operation selecting element, and storing the detected movement and stopped position; comparing the stored movement and stopped position of the pointer with a predetermined condition; and determining that the operation selecting element has been selected when the movement and stopped position of the pointer coincide with the condition.

In the invention described above, when an operator moves the pointer in a predetermined peripheral region of an icon according to a predetermined method, it is determined that the icon has been selected. Therefore, the operator can easily select and designate the operation selecting element such as the icon and the menu item.

BRIEF DESCRIPTION OF THE DRAWINGS

The above and another objects, features and advantages of the present invention will become apparent from the following detailed description when taken with the accompanying drawings in which.

DETAILED DESCRIPTION OF THE PREFERRED EMBODIMENTS

Figure 1:
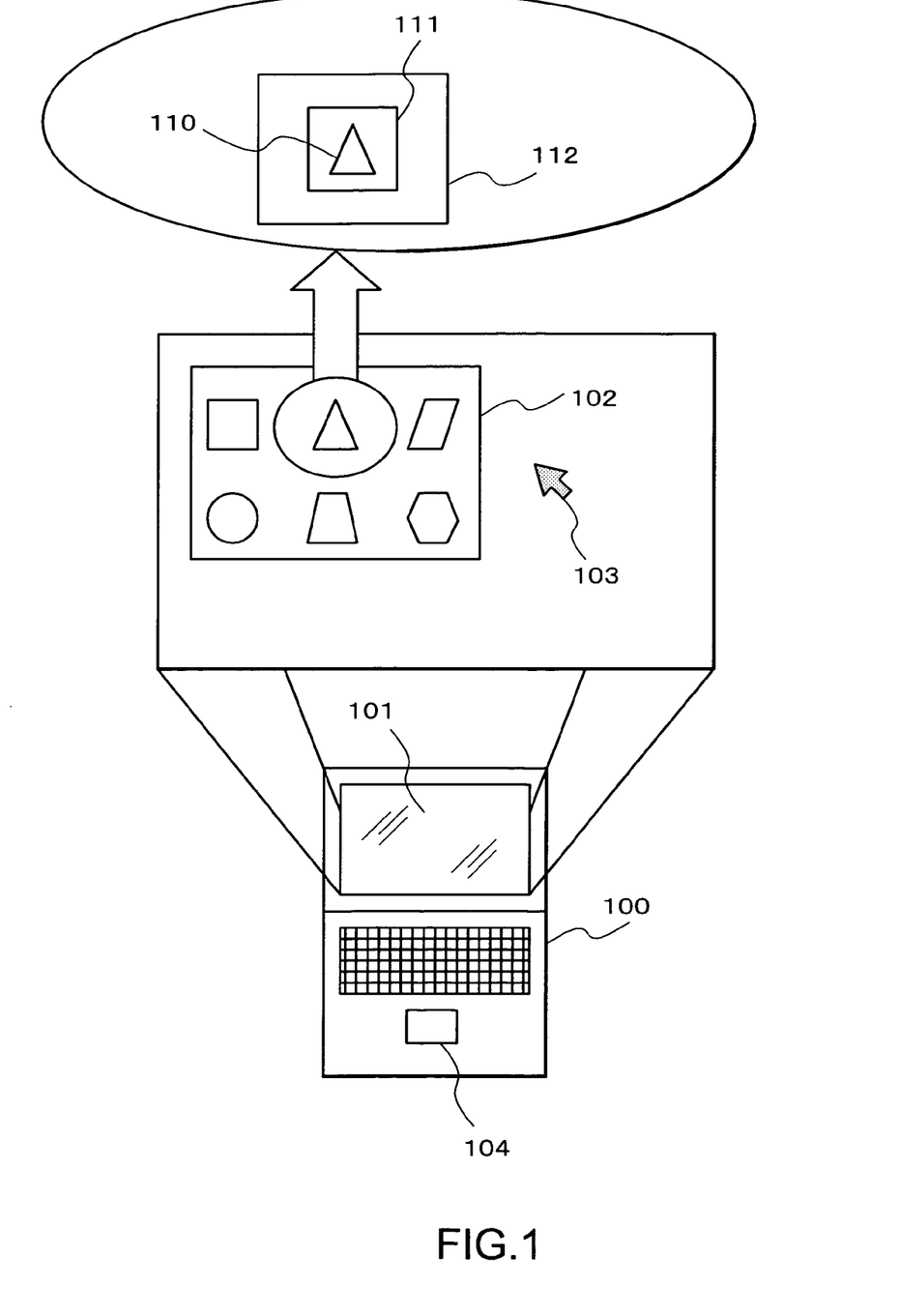
FIG. 1 is an enlarged view showing a display unit of an information apparatus according to an embodiment of the present invention.

Desirable embodiments of the present invention will be described below. Referring to FIG. 1, an enlarged view of a display unit of an information apparatus 100 is shown. The information apparatus 100 includes a display unit 101 and a pointing device 104. The display unit 101 displays plural icons 102. An operator operates the pointing device 104, thereby selecting a desired one of the icons 102 by using a pointer 103. In usual, an icon-equivalent region 111 is placed in a peripheral region of the icon 110. It is determined that the icon 110 has been selected when the pointer 103 selects the icon-equivalent region 111. In this embodiment, an icon-selection effective region 112 is set in a peripheral region of the icon-equivalent region 111. Even if the pointer selects the above-described region 112 by means of the conventional method, it is not determined that the icon 110 has been selected. However, when the pointer executes predetermined movement and stop in the icon-selection effective region 112 as will be described below, it is determined that the icon 110 has been selected. The above-described icon-equivalent region is not always necessary. Moreover, it is not necessary that the icon-selection effective region be a region surrounding the icon, and it is possible to form the icon-selection effective region in a predetermined region in the vicinity of the icon.

Figure 2:
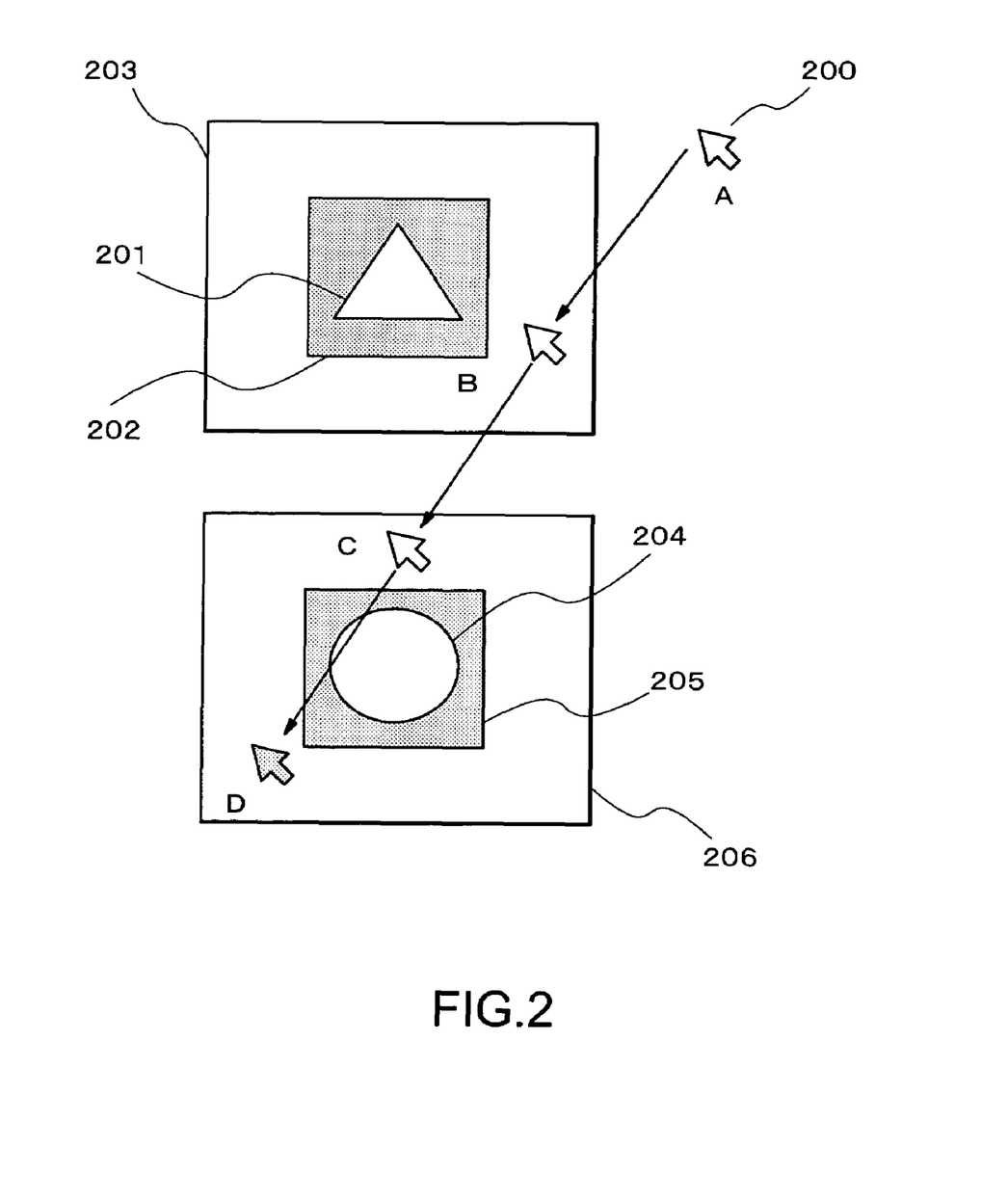
FIG. 2 shows an example of a process where a pointer moves and stops in peripheral regions of icons.

FIG. 2 shows an example of a process where the pointer moves and stops, in which it is determined that the icon has been selected. In the example shown in FIG. 2, when the pointer successively executes two or more movements and two or more stops in the icon-selection effective region 203, it is determined that the pointer has selected the icon. An icon-equivalent region 202 and an icon-selection effective region 203 are placed in a periphery of an icon 201. An icon-equivalent region 205 and an icon-selection effective region 206 are placed in a periphery of an icon 204. Now, a pointer 200 starts a movement from a stopped position A, passes through stopped positions B and C, and stops at a position D. In the icon-selection effective region 206, the pointer 200 successively executes two movements and two stops at the positions C and D. In this case, the information apparatus determines that the pointer 200 has selected the icon 204. Meanwhile, in the icon-selection effective region 203, the pointer 200 executes two movements and one stop. In this case, the pointer does not execute the movements and the stops according to the above-described condition. Therefore, the information apparatus does not determine that the icon 201 has been selected.

Figure 3:
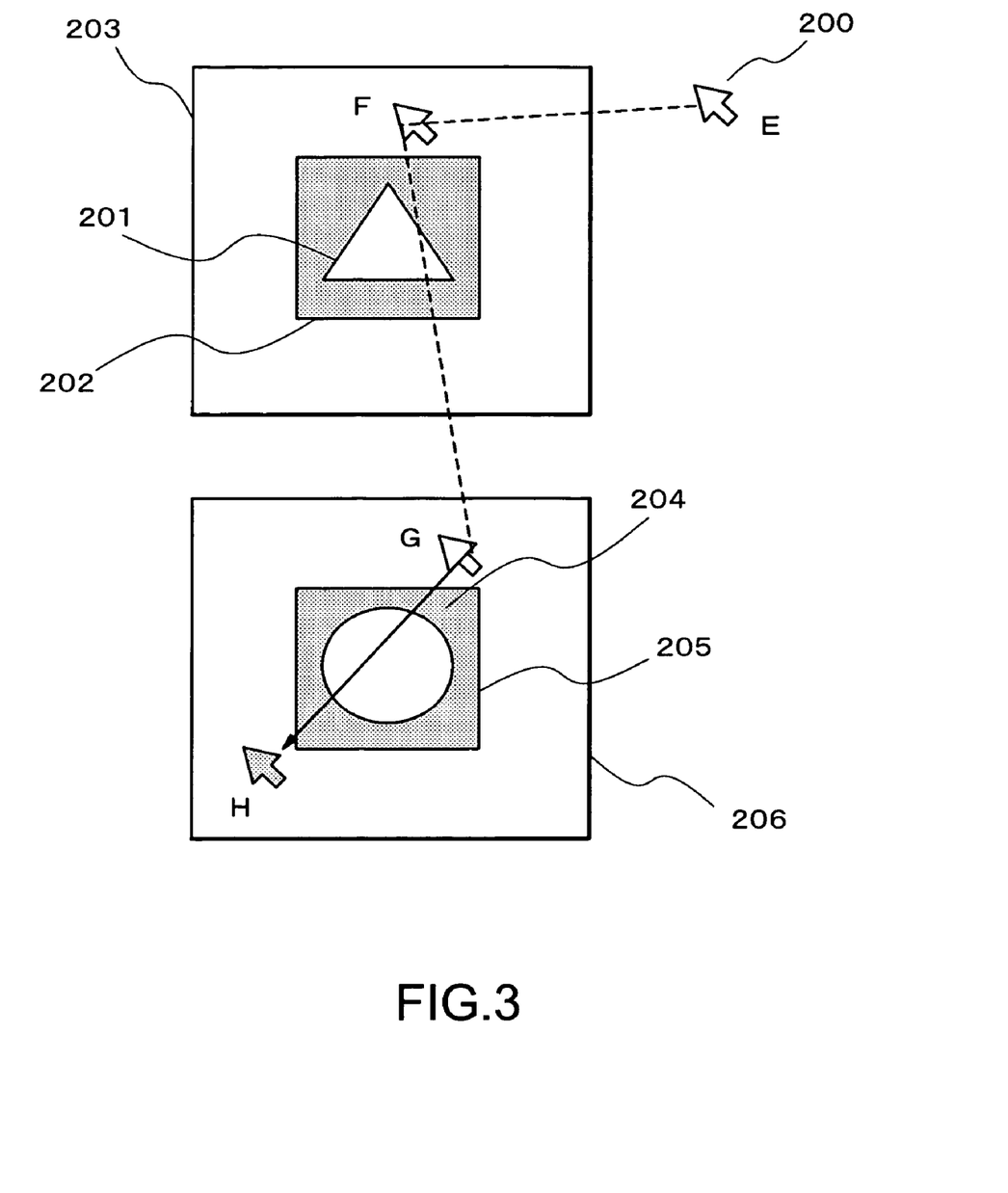
FIG. 3 shows another example of the process where the pointer moves and stops in the peripheral regions of the icons.

In an example shown in FIG. 3, when the pointer stops after changing a moving direction thereof in the icon-selection effective region, it is determined that the pointer has selected the icon. In this example, the pointer 200 moves from a stopped position E, passes through stopped positions F and G, and stops at a stopped position H. In the icon-selection effective region 206, the pointer 200 moves in directions different from each other, and thereafter stops at the position H. In this case, the information apparatus determines that the pointer 200 has selected the icon 204. In the icon-selection effective region 203, the pointer 200 executes two movements and one stop. However, the pointer 200 does not stop in the region 203 after changing the moving direction thereof. In this case, the pointer does not execute the movements and the stops according to the above-described condition. Therefore, it is not determined that the icon 201 has been selected. Note that, in the examples shown in FIGS. 2 and 3, it is possible that the above-described condition can be satisfied in both of the two icon-selection effective regions 203 and 206. In this case, which of the first icon 201 and the subsequent icon 204 is to be selected is decided by an initial setting of the information apparatus.

Figure 4:
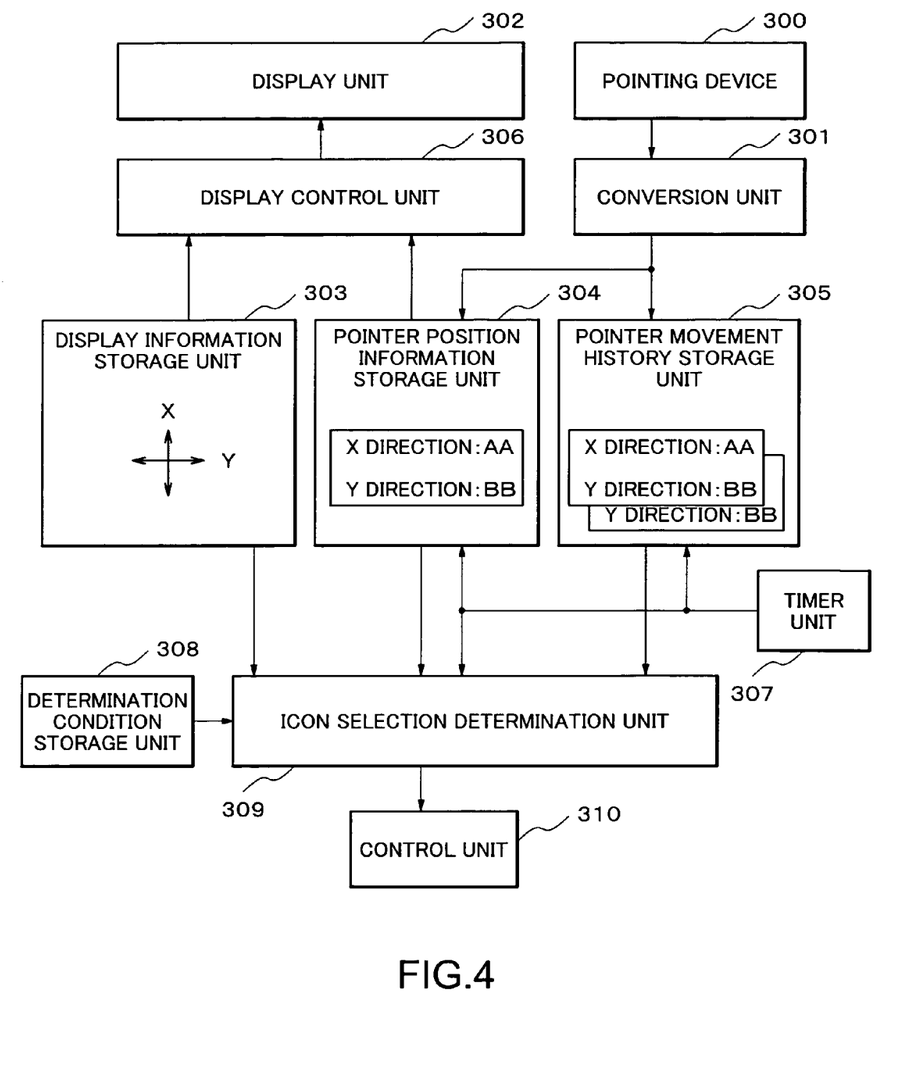
FIG. 4 is a block diagram of the information apparatus according to the embodiment of the present invention.

Referring to FIG. 4, a configuration of the embodiment of the information apparatus is shown. The information apparatus includes a pointing device 300 and a conversion unit 301. The conversion unit 301 converts an operation of the pointing device 300 into a movement of the pointer. The information apparatus includes a display unit 302, a display control unit 306, and a display information storage unit 303. The display control unit 306 controls display of the pointer, the icons, a menu, and the like. The display information storage unit 303 stores information regarding the display, which includes coordinate data on the display unit, the coordinate data relating to the icons, the icon-equivalent regions, and the icon-selection effective regions. The information apparatus further includes a pointer position information storage unit 304 and a pointer movement history storage unit 305. The information apparatus includes a timer unit 307 which generates a pointer position update request every fixed time. A determination condition storage unit 308 stores a condition for determining that the icon has been selected. The information apparatus further includes an icon selection determination unit 309 and a control unit 310. The icon selection determination unit 309 determines whether or not the icon has been selected based on the above-described condition and various pieces of data. The control unit 310 controls the information apparatus entirely.

Figure 5:
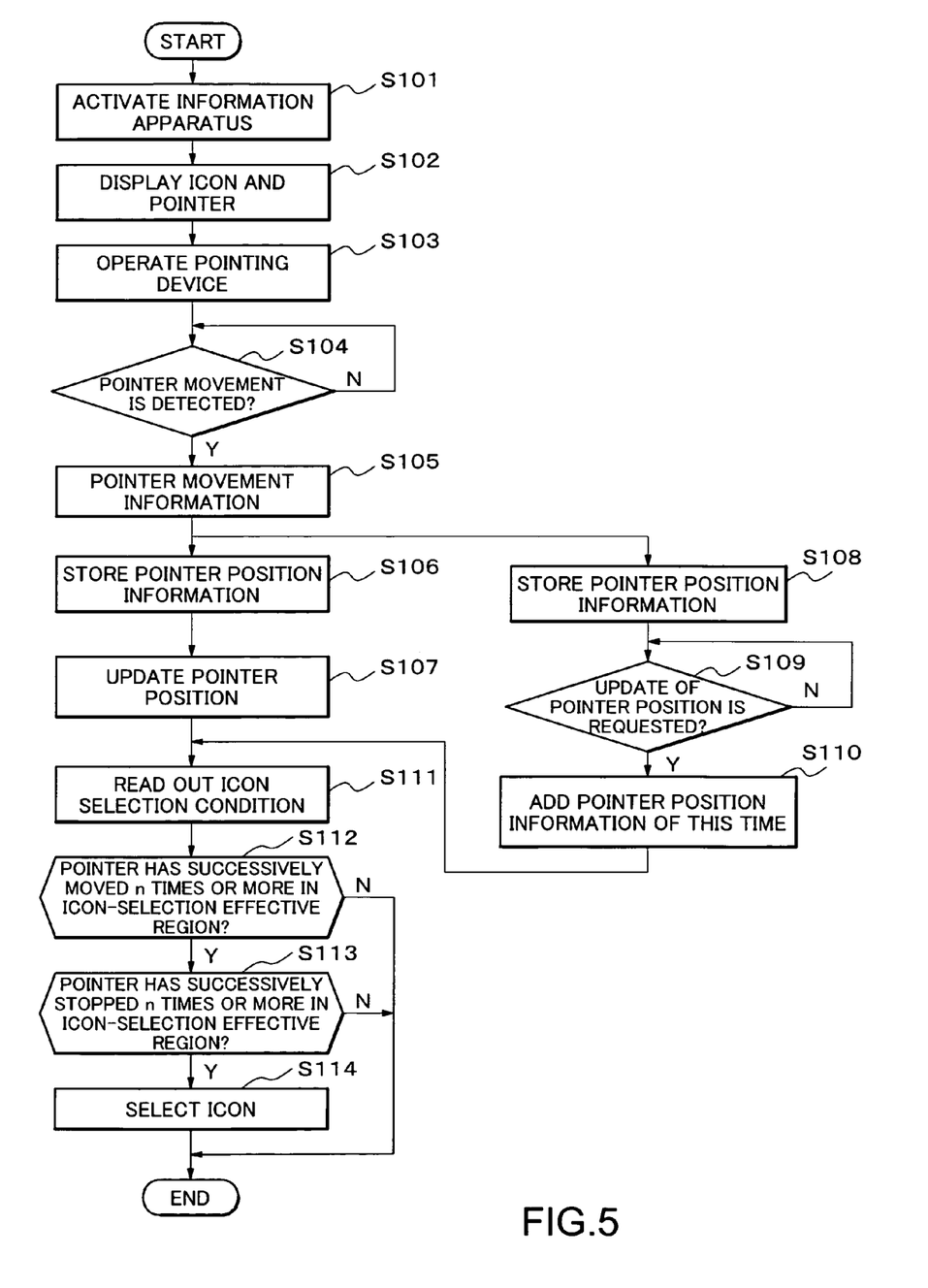
FIG. 5 shows an embodiment of selecting the icon by using a pointing device.

FIG. 5 shows an example of an operation of selecting the icon. An operator activates the information apparatus (Step S101). The pointer and the plural icons are displayed on the display unit (Step S102). The operator operates the pointing device (Step S103). The conversion unit 301 detects the operation of the pointing device and the movement of the pointer (Step S104), and converts the operation of the pointing device into the movement of the pointer (Step S105). The pointer position information storage unit 304 stores position information of the pointer, which is received from the conversion unit 301 (Step S106). The pointer position information storage unit 304 updates the position of the pointer according to a signal outputted from the timer unit 307 (Step S107). The pointer movement history storage unit 305 stores the position information of the pointer, which is received from the conversion unit 301 (Step S108), and monitors a signal of the pointer position update request, which is sent out from the timer unit 307 in a predetermined cycle (Step S109). The pointer movement history storage unit 305 detects the signal of the pointer position update request (YES in S109). The pointer movement history storage unit 305 abandons the second previous pointer position information, adds the received pointer position information, and stores the received pointer position information together with the previous pointer position information (Step S110). The signal of the pointer position update request is also transmitted to the pointer position information storage unit 304 and the icon selection determination unit 309. The movement and stop of the pointer are determined by receiving the position information (coordinate data) of the pointer every fixed time. When the position of the pointer is not changed during a fixed period of time, it is determined that the pointer is stopping, and when the position of the pointer is changed during the fixed period of time, it is determined that the pointer has moved. The moving direction of the pointer is also calculated from the position of the pointer. It is the icon selection determination unit 309 that makes the determinations described above. The icon selection determination unit 309 reads out the icon selection condition from the determination condition storage unit 308 (Step S111). The icon selection determination unit 309 reads out the respective data relating to the icons, the icon-equivalent regions, and the icon-selection effective regions from the display information storage unit 303. The icon selection determination unit 309 calculates the number of stops and movements of the pointer in the icon-selection effective regions based on the signals from the timer unit 307 and the data received from the pointer position information storage unit 304 and the pointer movement history storage unit 305. The icon selection determination unit 309 collates the icon selection condition read out from the determination condition storage unit 308 and a result of the calculation with each other, and determines whether the pointer has successively moved n times or more (n is an integer of 2 or more) in a specific icon-selection effective region (Step S112). In this embodiment, the pointer moves within a range defined as the same direction. When the above-described condition is satisfied, the icon selection determination unit 309 determines whether the pointer has stopped at least n times (n is an integer of 2 or more) in the icon-selection effective region concerned (Step S113). When the condition described above is satisfied, it is determined that an icon corresponding to the icon-selection effective region concerned has been selected (Step S114). When the condition described above is not satisfied, it is determined that the selection of the icon is invalid.

Figure 6:
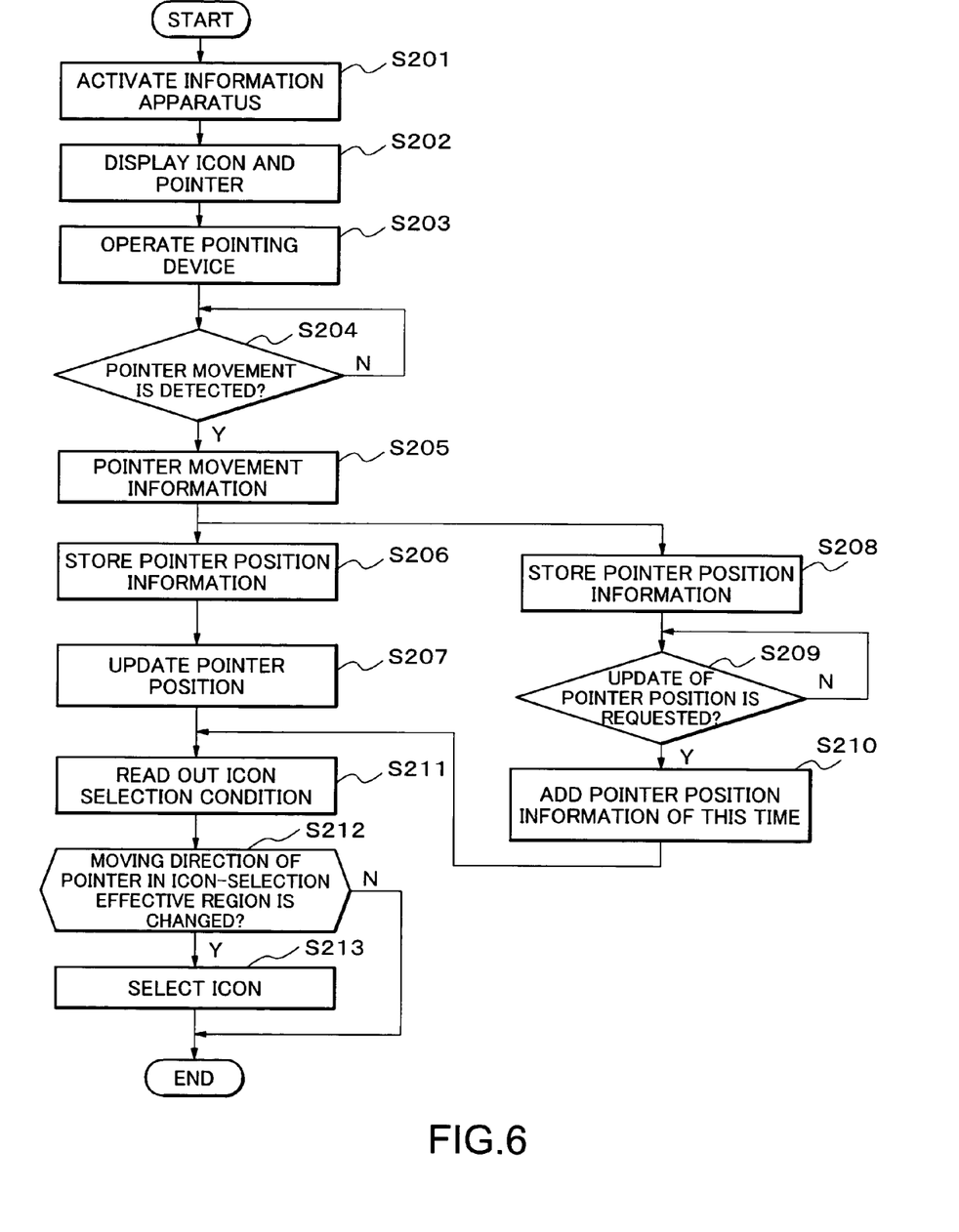
FIG. 6 shows another embodiment of selecting the icon by using the pointing device.

FIG. 6 shows another example of the operation of selecting the icon. Operations from S201 to S211 are the same as the operations from S101 to S111 which are shown in FIG. 5. The icon selection determination unit 309 reads out the icon selection condition from the determination condition storage unit 308. The icon selection determination unit 309 determines whether the moving direction (vector) of the pointer in a specific icon-selection effective region is changed according to the condition (Step S212). A determination (not shown) for the stopped position of the pointer is also executed. When the above-described condition is not satisfied, it is determined that the selection of the icon is invalid.

Figure 7:
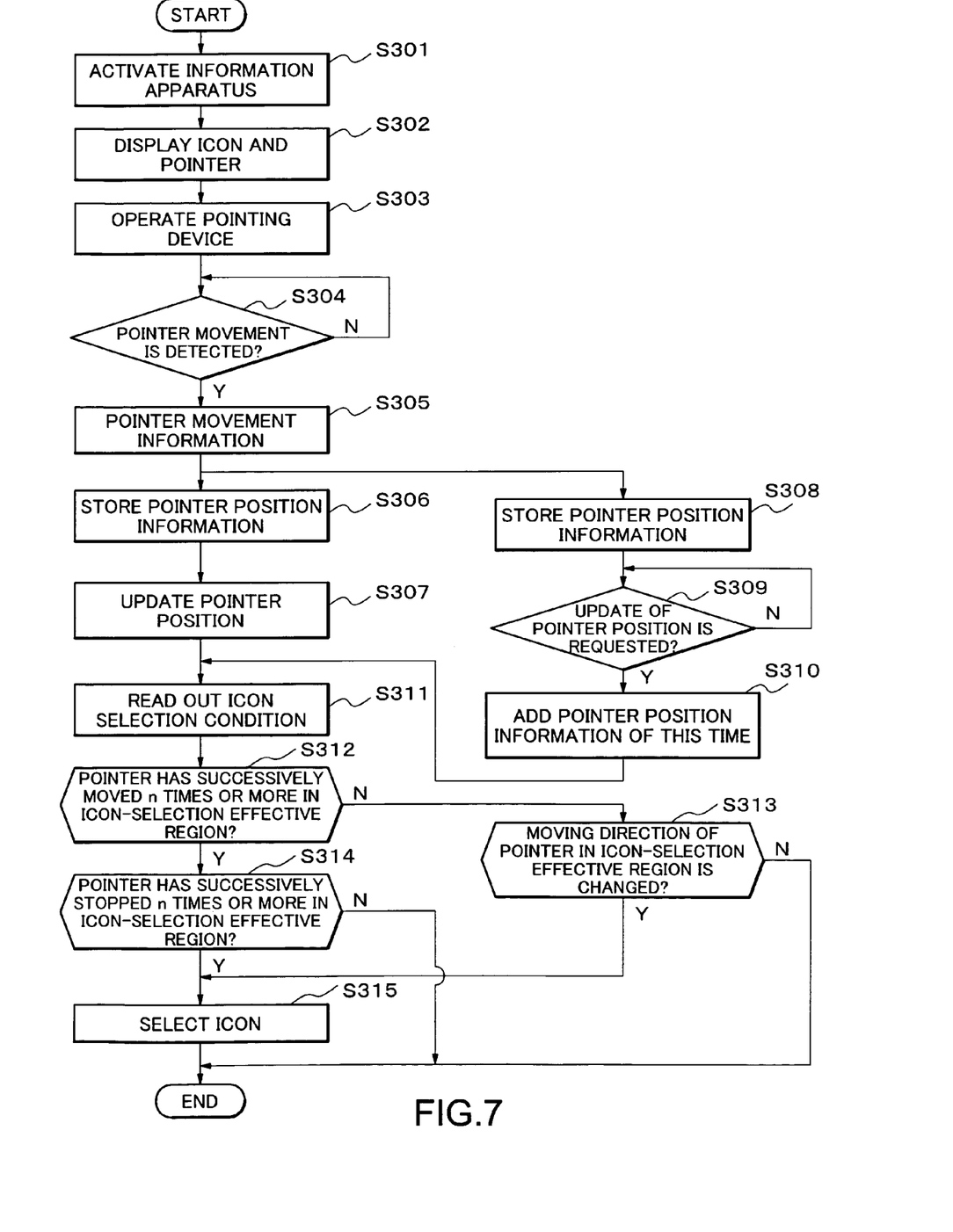
FIG. 7 shows still another embodiment of selecting the icon by using the pointing device.

FIG. 7 shows still another example of the operation of selecting the icon. Operations from S301 to S311 are the same as the operations from S101 to S111 which are shown in FIG. 5. The icon selection determination unit 309 collates the icon selection condition read out from the determination condition storage unit 308 and the result of the calculation with each other, and determines whether the pointer has successively moved at least n times (n is an integer of 2 or more) in a specific icon-selection effective region (Step S312). When the above-described condition is satisfied, the icon selection determination unit 309 determines whether the pointer has stopped at least n times (n is an integer of 2 or more) in the icon-selection effective region concerned (Step S314). When the condition described above is satisfied, processing for selecting an icon corresponding to the icon-selection effective region concerned is executed (Step S315). When the above-described condition is not satisfied, it is determined that the selection of the icon is invalid. When the number of movements of the pointer is less than n (NO in S312), the icon selection control unit 309 determines whether the moving direction (vector) of the pointer in a specific icon-selection effective region is changed according to the condition (Step S313). When the condition described above is satisfied, it is determined that the icon corresponding to the icon-selection effective region has been selected (Step S315). When the operation of S313 is executed, the determination for the stopped position of the pointer is also executed.

In the above-described embodiments, the case where the pointer selects the icon on the display unit has been described. However, the present invention is also applied to the case where the pointer selects a menu item on the display unit. In this case, a region on the display unit, which corresponds to the icon-selection effective region, can be formed not in the periphery of the menu item but in the vicinity of the menu item. Moreover, the present invention is also applicable to other elements on the display unit which are selected by the pointer and for which a predetermined operation is executed. As for the conditions for determining that the icon or the menu item has been selected, ones other than those in the above-described examples can also be set, which are, for example: in the icon-selection effective region, (a) the pointer changes the moving direction once; (b) the pointer changes the moving direction twice or more; and (c) the pointer passes through the region concerned three times or more. In particular, the information apparatus of the present invention is applied to small communication apparatuses such as a cellular phone and a personal digital assistant (PDA). However, the information apparatus is also applied to a computer and other information processing apparatuses, each of which has a relatively large display device.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. An information apparatus, comprising:
   a display unit configured to display an operation selecting element;
   a pointing device configured to control a pointer on the display unit;
   a pointer information storage unit configured to store information regarding movements and stops of the pointer on the display unit;
   an operation selecting element storage unit configured to store data on a predetermined peripheral region of the operation selecting element;
   a determination condition storage unit configured to store a condition to be satisfied to determined that the pointer has selected the operation selecting element; and
   a determination unit configured to determined whether or not the condition stored in the determination condition storage unit is satisfied based on the information regarding movements and stops stored in the pointer information storage unit, and configured to cause an operation associated with the operation selecting element to be executed in a where it is case determined that the condition is satisfied;
   said condition requiring at least that the pointer (i) move within the predetermined peripheral region, and then (ii) stop in the predetermined peripheral region, and then (iii) move again within the predetermined peripheral region after stopping.

2. The information apparatus according to claim 1, wherein the condition requires that the pointer moves and stops on the display unit a predetermined number of times or more in the predetermined peripheral region; and wherein the predetermined number of times is two or more.

3. The information apparatus according to claim 2, wherein the predetermined number of times is two.

4. The information apparatus according to claim 1, wherein the condition requires at least that the pointer (i) moves in a first direction within the predetermined peripheral region, and then (ii) stops in the predetermined peripheral region, and then (iii) moves in a second direction within the predetermined peripheral region that is different from the first direction.

5. The information apparatus according to claim 1, wherein the operation selecting element comprises at least one of an icon and a menu item.

6. The information apparatus according to claim 1, wherein the determination condition storage unit stores a plurality of conditions, and when any one of the plurality of conditions is satisfied, it is determined that the operation selecting element has been selected.

7. The information apparatus according to claim 1, wherein the information apparatus comprises a cellular phone.

8. The information apparatus according to claim 1, wherein the information apparatus comprises a computer.

9. A method of selecting an operation selecting element in an information apparatus including a display unit, the method comprising:
   detecting movement and stop positions of a pointer on the display unit, and storing the detected movement and stop positions;
   comparing the stored movement and stop positions of the pointer with a condition;
   determining that the pointer has selected the operation selecting element when the movement and stop positions of the pointer meet the condition; and
   cause an operation association with the operation selecting element to be executed when it is determined that the pointer has selected the operation selecting element;
   said condition requiring at least that the pointer (i) move within a peripheral region of the operation selecting element, and then (ii) stop in the peripheral region, and the (iii) move again within the peripheral region after stopping.

10. The method according to claim 9,
wherein the condition requires that the pointer moves and stops on the display unit a predetermined number of times or more in the peripheral region; and
wherein the predetermined number of times is two more.

11. The method according to claim 10,
wherein the predetermined number of times is two.

12. The method according to claim 9,
wherein the condition requires at least that the pointer (i) moves in a first direction within the peripheral region, and then (ii) stops in the peripheral region, and then (iii) moves in a second direction within the peripheral region that is different from the first direction.

13. The method according to claim 9,
wherein the operation selecting element comprises at least one of an icon and a menu item.

14. A method in an information apparatus, the method comprising:
determining when a pointer on a display unit satisfies a first condition, said first condition requiring at least that the pointer (i) move within an icon selection effective region of an icon, and then (ii) stop in the icon selection effective region, and then (iii) move again within the icon selection effective region after stopping, and then (iv) stop again in the icon selection effective region; and
executing an operation associated with the icon when it is determined that the pointer on the display unit satisfies the first condition.

15. The method of claim 14, further comprising:
determining when the pointer on the display unit satisfies a second condition, said second condition requiring at least that the pointer (i) move in a first direction within the icon selection effective region, and then (ii) stop in the icon selection effective region, and then (iii) move in a second direction within the icon selection effective region that is different from the first direction; and
executing the operation associated with the icon when it is determined that the pointer on the display unit satisfies the second condition.

* * * * *